United States Patent [19]
Wayne

[11] Patent Number: 5,265,993
[45] Date of Patent: Nov. 30, 1993

[54] TRUCK BED DIVIDER SYSTEM

[76] Inventor: Mark Wayne, 29436 Briarbank Ct., Southfield, Mich. 48034

[21] Appl. No.: 996,530

[22] Filed: Dec. 23, 1992

Related U.S. Application Data

[63] Continuation of Ser. No. 519,289, May 4, 1990, abandoned.

[51] Int. Cl.$^5$ .............................................. B01D 45/00
[52] U.S. Cl. ...................................... 410/129; 410/89; 410/141; 410/145; 296/39.2; 220/500; 220/533; 220/551; 220/552
[58] Field of Search ................ 410/89, 121, 123, 127, 410/129, 130, 132, 140–148, 150, 151; 220/532–546, 551, 552; 296/39.2

[56] References Cited

U.S. PATENT DOCUMENTS

| | | | |
|---|---|---|---|
| 560,893 | 5/1896 | Conant | 220/551 X |
| 2,214,042 | 9/1940 | Burdick | 220/543 X |
| 2,817,305 | 12/1957 | Stough | 410/144 |
| 2,845,307 | 7/1958 | Holmes | 410/144 X |
| 2,912,939 | 11/1959 | Miner, Jr. | 410/145 |
| 3,114,338 | 12/1963 | Schroeder et al. | 410/146 |
| 3,352,595 | 11/1967 | Bezlaj | 410/132 X |
| 3,431,015 | 3/1969 | Breen et al. | 410/89 X |
| 4,079,677 | 3/1978 | Vandergriff et al. | 410/147 |
| 4,085,685 | 4/1978 | Stone | 410/146 |
| 4,091,745 | 5/1978 | Patch | 410/146 |
| 4,236,854 | 12/1980 | Rogers | 410/121 |
| 4,343,578 | 8/1982 | Barnes | 410/151 |
| 4,473,331 | 9/1984 | Wisecarver | 410/151 X |
| 4,531,775 | 7/1985 | Beals | 220/532 X |
| 4,702,653 | 10/1987 | Gaulding | 410/144 |
| 4,720,222 | 1/1988 | Nagy et al. | 410/151 |
| 4,737,056 | 4/1988 | Hunt | 410/151 |
| 4,772,165 | 9/1988 | Bartkus | 410/145 X |
| 4,781,499 | 11/1988 | Wisecarver | 410/151 |
| 4,834,599 | 5/1989 | Gordon et al. | 410/151 |
| 4,880,342 | 11/1989 | Pradovic | 410/121 |
| 4,887,947 | 12/1989 | Bott | 296/39.2 X |
| 4,889,253 | 12/1989 | Schmulian et al. | 220/551 |
| 4,917,429 | 4/1990 | Giger | 220/552 X |
| 4,943,194 | 7/1990 | Aguilar | 410/141 X |
| 4,961,677 | 10/1990 | Downard, Jr. | 410/129 |
| 4,986,706 | 1/1991 | Williams, Jr. | 410/140 X |

FOREIGN PATENT DOCUMENTS 580720  8/1959  Canada .................. 410/145

*Primary Examiner*—Michael S. Huppert
*Assistant Examiner*—Stephen T. Gordon
*Attorney, Agent, or Firm*—Gifford, Groh, Sprinkle, Patmore and Anderson

[57] ABSTRACT

A truck bed divider system for placement within the bed of a truck includes at least one primary divider and at least one secondary divider. The primary dividers include brackets at each end that provide a frictional fit against the interior side of the walls of the bed of the truck. By a slotted interrelationship, the primary dividers are situated within the bed at their preferred positions and are thereafter adjusted by extending the brackets outward relative to the divider body to their maximum extent whereby they are pressed against the side of the bed and held thereto by tension, thus eliminating the need for fasteners. The secondary dividers are provided with hooks at their ends and are interfittable between the primary dividers by being hooked into slots perpendicularly defined in the body of the primary dividers. Both primary and secondary dividers are preferably provided with shelf extensions for the placement of shelves thereupon.

14 Claims, 3 Drawing Sheets

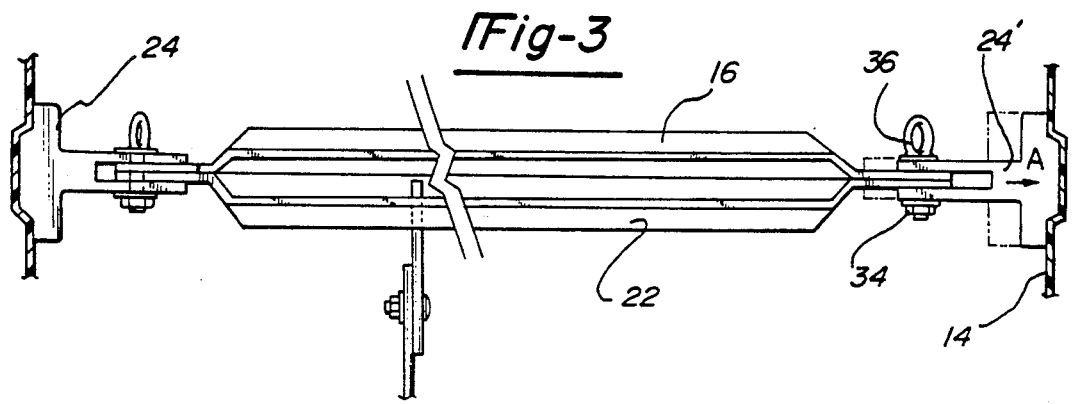
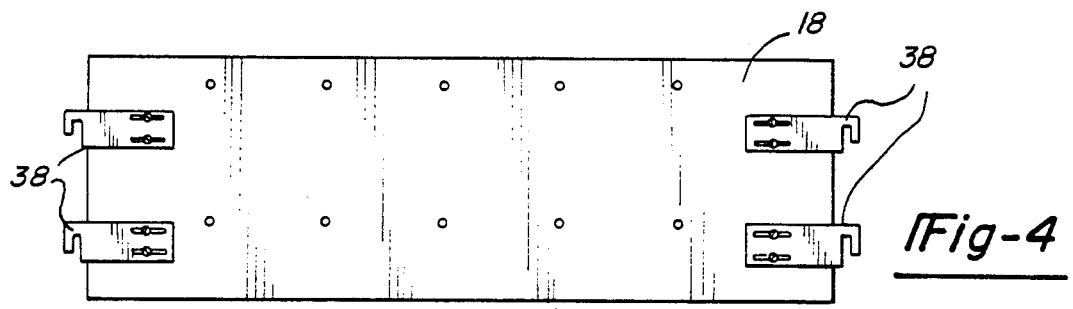
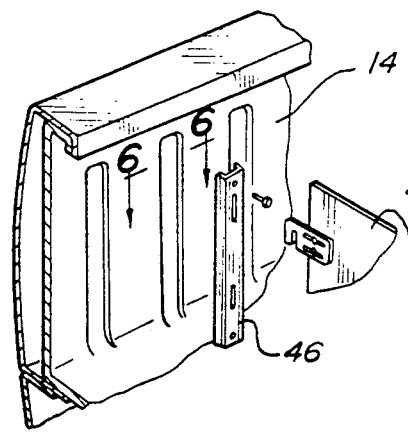
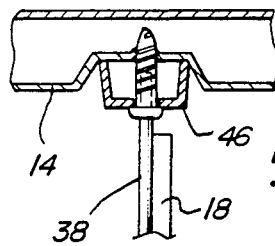
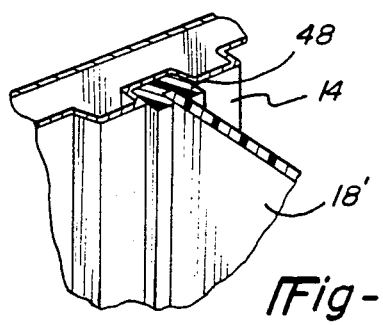
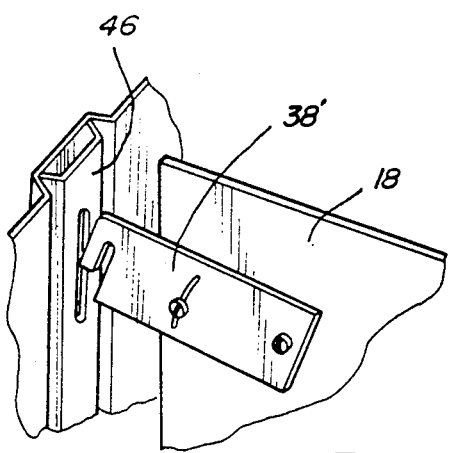

TRUCK BED DIVIDER SYSTEM

This is a continuation of copending application Ser. No. 07/519,289 filed on May 4, 1990 and now abandoned.

BACKGROUND OF THE INVENTION

I. Field of the Invention

The present invention relates generally to truck bed divider systems. More particularly, the present invention relates to a truck bed divider system comprising primary walls for frictional engagement with the interior walls of the pickup bed and secondary walls for slottable interplacement between the primary walls.

II. Description of the Relevant Art

In recent years the great utility of the pickup truck has been recognized. The pickup truck, being as it is multi-functional and highly versatile, offers the advantages of being usable to haul goods and, at the same time, being capable of hauling passengers in an interior cab environment comparable to the comforts known and appreciated in the average car.

One of the known disadvantages of the present truck bed is that, while serving very well the desired purpose of placement therein of large loads, it does not function particularly well when being utilized to ship and carry smaller goods. Unless the smaller goods are particularly heavy or include a flat underside, they tend to shift and roll about, in that their motion is relatively unrestricted.

This situation is compounded by the fact that pickup trucks tend to deliver a relatively stiff ride. Every small bump or rut is felt in the truck, and the bed, being uncushioned, receives these shocks directly. Anything not tied or weighted down moves in response to each jolt.

In an effort to minimize this characteristic, bed boxes have been utilized. These boxes typically comprise a box interfittable between the side walls and placeable against the front wall of the bed. The box conventionally has two doors on its top side, each being situated so as to open opposite the other. The box is generally provided with a lock.

However, while providing some relief to the problem, these bed boxes tend to be rather expensive and are not easy to fit in place within the pickup truck bed. Because the bed box does not extend to the floor of the bed but rather leaves a space between the floor and the bottom of the box, it does not provide much space for carrying the desired goods. Additionally, the bed box is not usable once a bed cover or bed cap is fitted. When the bed is covered by either construction, there is no practical system for dividing the bed into usable compartments.

Accordingly, prior approaches to providing effective bed divider systems have failed to eliminate the problems commonly associated with pickup truck beds.

SUMMARY OF THE PRESENT INVENTION

The present invention provides a truck bed divider system for placement within the bed of a truck that overcomes the problems associated with maximization of the utility of the pickup truck bed. While the divider system of the present invention is primarily directed at use in a pickup truck, its application may be extended to use in the commercial van or passenger van.

The truck bed divider system of the present invention provides a system that is easily placed in the truck bed and is easily removed. The divider system of the present invention is primarily directed to use in a truck bed having a bed liner disposed therein where the liner has vertically corrugated sides as is commonly the case, although it may be used in any bed having corrugated or substantially planar interior wall surfaces.

The divider system fundamentally comprises two types of divider walls, primary dividers and secondary dividers. The primary dividers abut the interior wall surfaces, while the secondary dividers are interfittable between the primary dividers. Of course, a single divider may act as both a primary divider and a secondary divider if one end abuts an interior wall surface and the other end interlocks a primary divider.

The primary divider includes a frictional-engagement bracket at each end. The bracket fits into a recessed segment of the corrugated wall. In a preferred embodiment, by a slotted nut and bolt relationship, the placement of the bracket may be adjusted relative to the body of the divider and may be extended outwardly or inwardly as the situation requires for tight abutment against an interior wall surface of the bed. Once generally situated at the desired position within the pickup truck bed, the brackets are moved outwardly away from the body until seized tightly against the selected interior wall surfaces. The fasteners are then tightened to maintain this position. By the present system, the primary dividers do not require attachment to the walls Of the bed by fasteners and the like, and accordingly may be easily removed.

The bolt of the primary divider fastener assembly preferably is an eyebolt, thus providing additional points of attachment for ropes or similar hold-down methods.

The body of the primary divider has perpendicularly defined therein a number of elongated slots. The slots accomodate slotted hooks fitted at the ends of the secondary dividers. This construction provides for a fastener-free assembly of the secondary dividers relative to the primary dividers. Like the primary dividers, the secondary dividers may be easily installed and removed.

The brackets fitted to the secondary dividers have slots axially defined therein to accomodate adjustment of the brackets with respect to the dividers as may be necessary.

Both the primary and secondary dividers are preferably provided with elongated, axial shelf brackets. These brackets allow for selective placement thereupon of one or more shelves or cover assemblies.

As an alternate method of attachment of both the primary and secondary dividers, pivotable brackets are fitted to the interior surfaces of the walls or on the primary dividers. The brackets have slots defined therein and may be pivoted from an upright position to release a divider to a lowered locked position whereby the divider is locked within the slot of the bracket.

As a possible option, the divider system of the present invention includes one or more section covers for placement over a subdivided section, thereby providing protection and security for a selected section.

Other advantages and features of the present invention will become apparent from the following detailed description when read in conjunction with the accompanying drawing.

BRIEF DESCRIPTION OF THE DRAWING

The present invention will become more fully understood by reference to the following detailed description of the preferred embodiments of the present invention when read in conjunction with the accompanying drawing, in which like reference characters refer to like parts throughout the views and in which:

FIG. 3 is a top view illustrating the primary divider of the present invention in place between two interior wall surfaces of a bed, partially shown;

FIG. 4 is an elevational side view illustrating the seconary divider of the present invention;

FIG. 5 is a perspective view illustrating an alternate method of attaching a divider according to the present invention;

FIG. 6 is a view taken along line 6—6 of FIG. 5;

FIG. 7 is an additional alternate embodiment showing attachment of a divider;

FIG. 8 is a perspective view of yet another embodiment of attachment;

DETAILED DESCRIPTION OF THE PREFERRED EMBODIMENT OF THE PRESENT INVENTION

Figure 1:
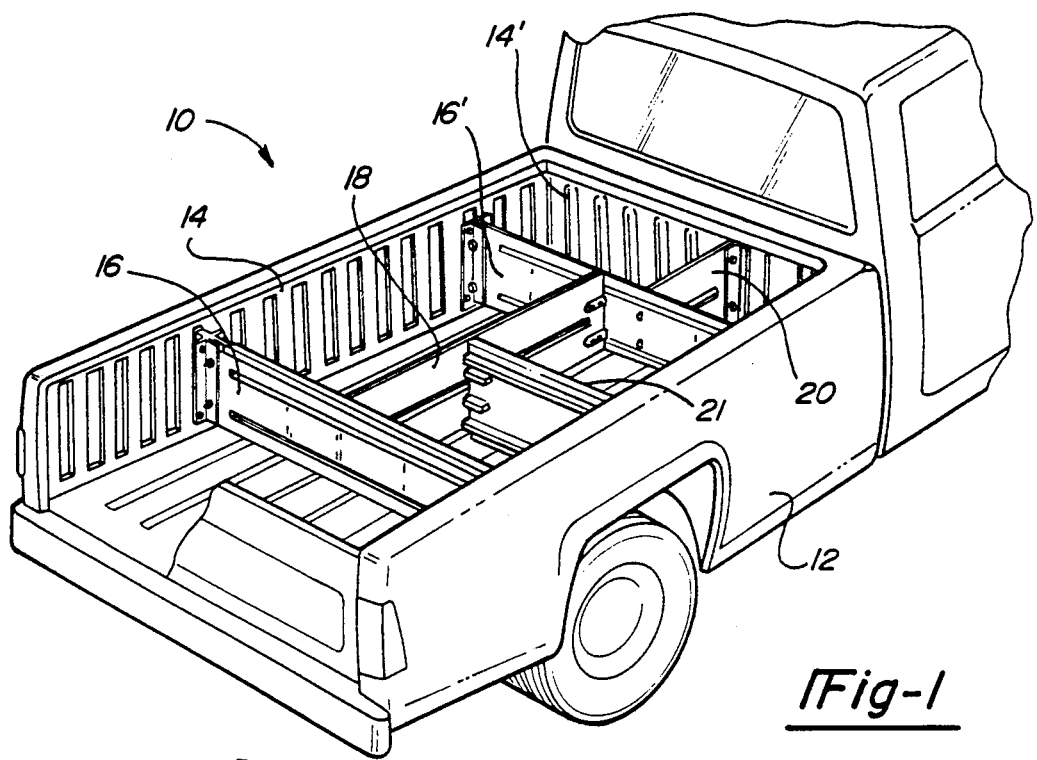
FIG. 1 is a perspective view of a pickup truck bed showing the divider system of the present invention in place therein.

The drawing discloses the preferred embodiment of the present invention. While the configurations according to the illustrated embodiments are preferred, it is envisioned that alternate configurations of the present invention may be adopted without deviating from the invention as portrayed. The preferred embodiment is discussed hereafter.

Referring to FIG. 1, a pickup truck, generally indicated as 10, includes a truck bed 12. Of course, in lieu of the pickup truck 10, a van (not shown) may be selected for use with the present invention.

Within the interior space of the bed 12 there are defined a plurality of interior wall surfaces 14, 14'. The surfaces 14, 14' are typically corrugated as shown or may be substantially smooth. Very often bed liners disclose the corrugated appearance. While primarily suitable for applications to beds having corrugated walls, the present invention may be employed in beds with smooth-walled construction.

Within the interior space of the bed 12 there are positioned a pair of primary dividers 16, 16' and a pair of secondary dividers 18, 20. Of course, the disposition of the dividers 16, 16', 18, 20 is only suggested, and the dividers 16, 16', 18, 20 may be fitted in alternate configurations from that illustrated.

Figure 2:
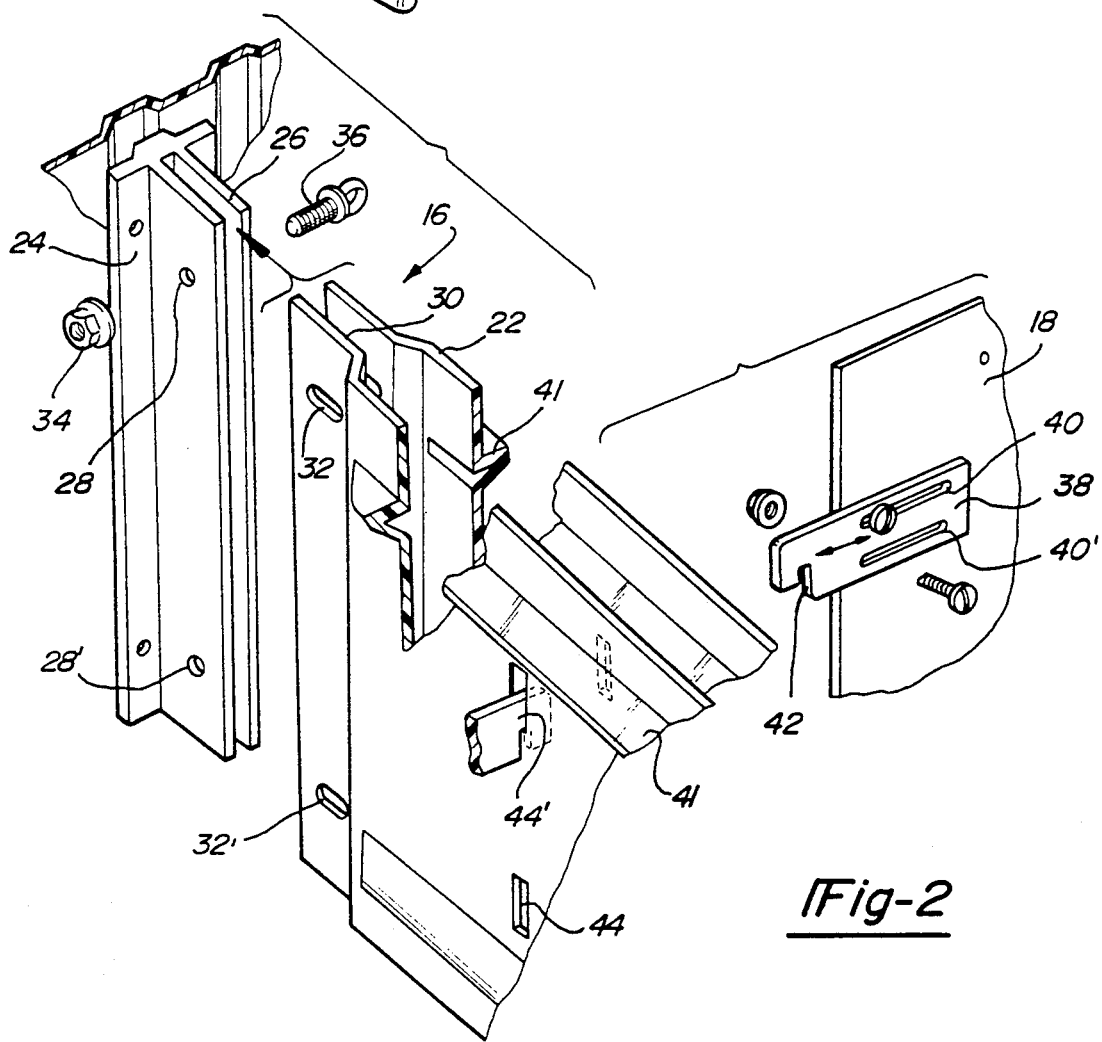
FIG. 2 is a close-up exploded view of the principal attacment brackets and fasteners of the primary and secondary dividers according to the present invention.

Referring to FIG. 2, a detailed perspective view of the preferred bracket-divider construction and relationship is illustrated. As may be understood, the primary divider 16 comprises a primary divider body 22 and a primary divider bracket 24. The body 22 is preferably composed of two portions as illustrated in the exploded view to accomodate the secondary divider brackets as will be described below.

A portion of the secondary divider 18 is illustrated. The divider 18 has fixed thereto an adjustable bracket 38 that preferably has a pair of slots 40, 40' axially defined therein. At one end of the bracket 38 is defined an attachment slot 42 for removable interattachment with any one of a number of slots 44, 44' defined in the primary divider body 22 of the primary divider 16.

The primary divider bracket 24 includes a channelled region 26 axially defined therealong. The channelled region 26 has defined therein a number of fastener receiving apertures 28, 28'. The body 22 has a flange region 30 for being slottingly fitted within the channelled region 26. A number of fastener slots 32, 32' are defined in the flange region 30. A nut 34 and a bolt 36 are interconnected with the fastener aperture 28 and the fastener slot 32. The bolt 36 is preferably an eye bolt as illustrated for providing an optional fastening point for a rope or a tie down strap (not illustrated). This slotted construction allows for movement of the bracket 24 inwardly and outwardly relative the body 22.

Each of the dividers may be provided with one or more shelf-receiving brackets 41. The brackets 41 provide disposed thereon of a shelf, a box, or a cover as disclosed below with respect to FIGS. 11 and 12. The brackets 41 also strengthen the dividers.

FIG. 3 illustrates the placement and adjustment of the primary divider 16 relative the interior surfaces of the walls of the bed 12.

With reference thereto, the bracket 24 is fixed in its position with respect to the body 22. Thereafter, an opposing bracket 24', is adjusted outwardly and away from the body 22 in the general direction of arrow "A" to frictionally engage the inner surface 14 of the bed 12. Once maximum friction is achieved, the nut 34 and the bolt 36 are tightened and the primary divider 16 is locked in place.

Referring to FIG. 4, a raised elevational view of the secondary divider 18 is illustrated to reveal the placement of the brackets 38.

Referring to FIG. 5, a perspective view of an alternate embodiment of a method of attaching the secondary divider 18 to the inner wall surface 14 is illustrated and comprises a slotted, elongated bracket member 46 fastened to the surface 14. FIG. 6 is a sectional view of the assembly in place and interlocked according to a view taken along line 6—6 of FIG. 5.

With reference to FIG. 7, a simplified construction for frictionally engaging a bracketless secondary divider 18' with the inner surface 14 is illustrated. A channelled bracket 48 is positioned in a recessed portion of the corrugated wall and the divider 18' is thereafter positioned therein.

With reference to FIG. 8, a modified bracket 38' is pivotably mounted on the divider 18 for attachment to the bracket 46 of the embodiment illustrated in FIG. 5. This pivotable interattachment facilitates simplified locking and unlocking.

Figure 9:
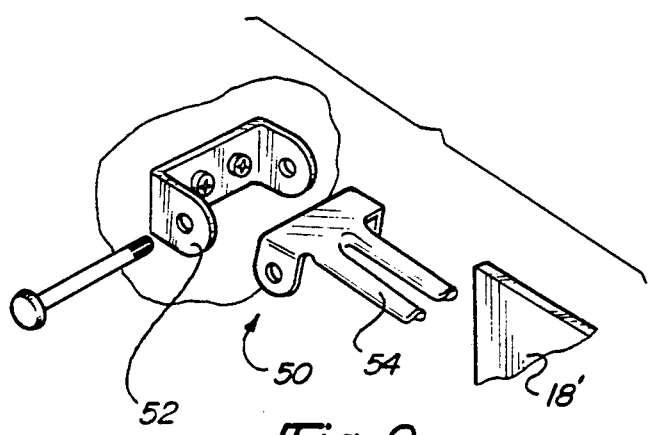
FIG. 9 illustrates an alternate system for locking a primary or secondary divider in place.
Figure 10:
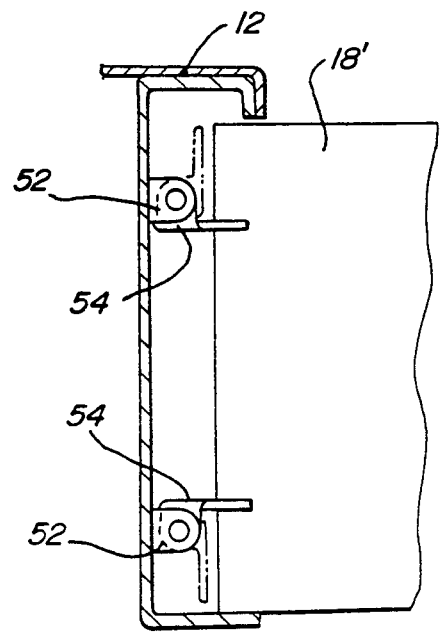
FIG. 10 illustrates a partial elevational side view showing the locking embodiment of FIG. 9 in its locked position.

FIGS. 9 and 10 disclose still another alternate method of fixing the bracketless secondary divider 18' in place within the bed 12. According to this embodiment, a pivotable assembly 50 comprising a fixed plate 52 and a pivotable slotted arm 54 is illustrated. The bracketless divider 18' is positioned in its selected place and the arms 54 are pivotable to their perpendicular positions as illustrated in solid lines in FIG. 10. The shadow lines illustrate the unlocked or folded position of the arms 54.

Figure 11:
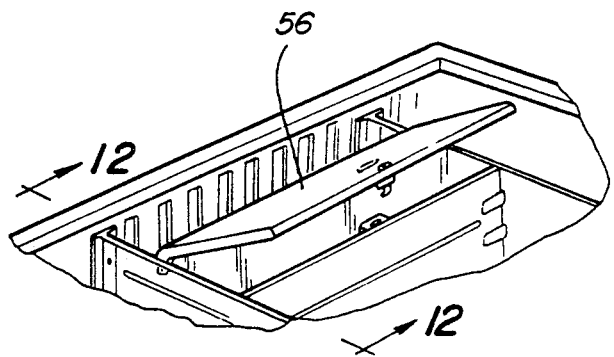
FIG. 11 illustrates a box top construction for covering a divided segment.
Figure 12:
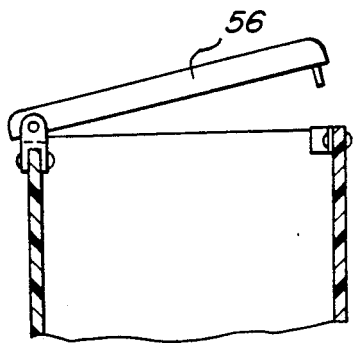
FIG. 12 is an elevated cut-away side view taken along line 12—12 of the box top construction illustrated in FIG. 11.

To provide protection from both theft and the weather, a cover 56 may be fitted over interrelated dividers to cover a segment defined thereby as illustrated in FIGS. 11 and 12. One or more covers 56 may be hingedly fitted as selected or as is necessary.

Having described my invention, however, many modifications thereto will become apparent to those skilled in the art to which it pertains without deviation from the spirit of the invention as defined by the scope of the appended claims.

I claim:

1. A vehicle bed divider system for dividing the interior space of a vehicle bed into two or more segments, said system comprising:

at least one primary divider, said primary divider being removably interfittable between opposing interior wall surfaces of said vehicle bed;

said at least one primary divider having a primary divider body and means provided on the opposite ends of said primary divider body for engaging said opposing interior wall surfaces of said vehicle bed to secure said primary divider to said opposing interior wall surfaces;

said engaging means frictionally engaging said primary divider to said opposing interior wall surfaces of said vehicle bed;

said engaging means further comprising a bracket having a wall engaging side and a divider body receiving side;

said bracket being adjustably connected to said primary divider body permitting said bracket to be adjusted outwardly or inwardly relative said primary divider body;

at least one secondary divider removably disposable between two spaced apart primary dividers;

means for engaging said secondary divider with said two spaced apart primary dividers;

said secondary divider including a secondary divider body;

said engaging means for engaging said secondary divider comprising a bracket having a slotted end, said bracket being attached to said secondary divider body; and said divider body of said primary divider having slots defined therein for slottingly receiving said slotted end of said secondary divider bracket.

2. The vehicle bed divider system of claim 1 further including at least one tertiary divider removably disposable between said at least one primary divider and one of said interior wall surfaces.

3. The vehicle bed divider system of claim 1 further including at least one tertiary divider removably disposable between said at least one secondary divider and one of said interior wall surfaces.

4. The vehicle bed divider system of claim 1 wherein said primary divider bracket has a channel axially provided therein for receiving a portion of said primary divider body, said channel having at least one fastener aperture defined therein.

5. The vehicle bed divider system of claim 4 wherein said portion of said primary divider body received within said channel has at least one fastener slot provided therein to permit said primary divider bracket to be adjusted outwardly and inwardly relative to said primary divider body.

6. The vehicle bed divider system of claim 5 further including a fastener assembly for disposition through said fastener aperture and said fastener slot for fixing the position of said primary divider bracket and primary divider body relative one another.

7. The vehicle bed divider system of claim 6 wherein said fastener assembly includes a bolt member and a nut member, said bolt member having an eye portion.

8. The vehicle bed divider system of claim 1 wherein said secondary divider bracket is adjustably attached to said secondary divider body.

9. The vehicle bed divider system of claim 8 wherein said primary divider body has axially provided thereupon at least one shelf-engageable bracket.

10. The vehicle bed divider system of claim 9 wherein said secondary divider body has axially provided thereupon at least one shelf-engageable bracket.

11. The vehicle bed divider system of claim 1 wherein said primary divider body is composed of a first half and a second half, said first and second halves defining an internal body cavity therebetween.

12. The vehicle bed divider system of claim 1 further including at least one operable section cover for placement over selected ones of the divided bed sections partially defined by said at least one primary divider.

13. The vehicle bed divider of claim 1 wherein said opposing interior wall surfaces of said truck bed are corrugated having recessed segments, said primary divider means for engaging engage said corrugated sidewalls in said recessed segments.

14. The vehicle bed divider of claim 1 wherein said truck bed has a truck bed liner having corrugated side walls, and wherein said corrugated side walls have opposing recessed segments, said primary divider means for engaging engage said corrugates side walls of said liner in said opposing recessed segments.

* * * * *